(12) United States Patent
Chen

(10) Patent No.: US 6,654,071 B2
(45) Date of Patent: Nov. 25, 2003

(54) FLEXIBLE CURRENT-TYPE TOUCH CONTROL PANEL COMPRISING A CURRENT-TYPE TOUCH CONTROL SHIELD

(75) Inventor: Chi Ruey Chen, Chung-Li (TW)

(73) Assignee: eTurboTouch Technology Inc., Chung-Li (TW)

( * ) Notice: Subject to any disclaimer, the term of this patent is extended or adjusted under 35 U.S.C. 154(b) by 110 days.

(21) Appl. No.: 09/931,236

(22) Filed: Aug. 17, 2001

(65) Prior Publication Data

US 2002/0190961 A1 Dec. 19, 2002

(30) Foreign Application Priority Data

Jun. 13, 2001 (TW) .................................... 90209922 U

(51) Int. Cl.[7] ..................... G02F 1/1335; G02F 1/1333; G09G 3/36; G09G 5/00
(52) U.S. Cl. ......................... 349/12; 349/84; 345/104; 345/173
(58) Field of Search ....................... 349/12, 84; 345/87, 345/104, 173

(56) References Cited

U.S. PATENT DOCUMENTS

| 4,484,038 | A | * | 11/1984 | Dorman et al. ............. 200/5 A |
| 5,623,280 | A | * | 4/1997 | Akins et al. ................ 345/104 |
| 6,020,943 | A | * | 2/2000 | Sonoda et al. ................ 349/12 |
| 6,329,044 | B1 | * | 12/2001 | Inoue et al. ................ 428/209 |
| 6,501,528 | B1 | * | 12/2002 | Hamada ..................... 349/158 |
| 2001/0022632 | A1 | * | 9/2001 | Umemoto et al. ............. 349/12 |
| 2001/0026330 | A1 | * | 10/2001 | Oh ............................... 349/12 |

* cited by examiner

*Primary Examiner*—Tarifur R. Chowdhury
(74) *Attorney, Agent, or Firm*—Bacon & Thomas, PLLC

(57) ABSTRACT

A flexible, current-type touch control panel comprises a current-type touch control shield consisting of a plurality of material layers and being printed on a flexible, transparent plastic membrane, thus forming the flexible, current-type touch control panel which is flexibly bendable to an angle of at least from 0°–180°.

5 Claims, 9 Drawing Sheets

FLEXIBLE CURRENT-TYPE TOUCH CONTROL PANEL COMPRISING A CURRENT-TYPE TOUCH CONTROL SHIELD

BACKGROUND OF THE INVENTION

The present invention relates to a flexible touch control panel of the current-type, in particular a touch control panel which may be bent into an arcuate or curved shape for implementation in various display panels with a curved face or the folded-type display panels.

The touch control shield in the prior art is directly printed on the liquid crystal panel or other display devices. It is difficult to print the material of such touch control shield of the prior art directly onto arcuate-faced or folded-type display panels. Therefore, the subject of this invention is to find a way to directly print a current-type touch control shield on a layer of flexible, thin plastic sheet such that the entire touch control panel possesses the property of flexibility and thus can be adhered onto a display panel having a curved surface.

SUMMARY OF THE INVENTION

Accordingly, a main object of the present invention is to provide a flexible touch control panel of the current-type, in which the characteristic of bending (angular) flexibility possessed by the touch control panel is put into play so that the touch contact sheet may be attached onto any display panel with curved shape.

A further object of the present invention is to provide a flexible touch control panel of the current-type, in which the touch control panel may be bent at least at an angle of from 0°–180° along the center edge thereof.

To achieve the above objects, the present invention provides a flexible touch control panel of the current-type comprising a flexible, current-type touch control panel, comprising a current-type touch control shield consisting of a plurality of material layers and being printed on a flexible, transparent plastic membrane, thus forming the flexible, current-type touch control panel which is flexibly bendable to an angle of at least from 0°–180°.

BRIEF DESCRIPTION OF THE DRAWING

Other features and advantages of the present invention will become apparent in the following detailed description of the preferred embodiment with reference to the accompanying drawings, in which.

DETAILED DESCRIPTION OF THE PREFERRED EMBODIMENT

Figure 1:
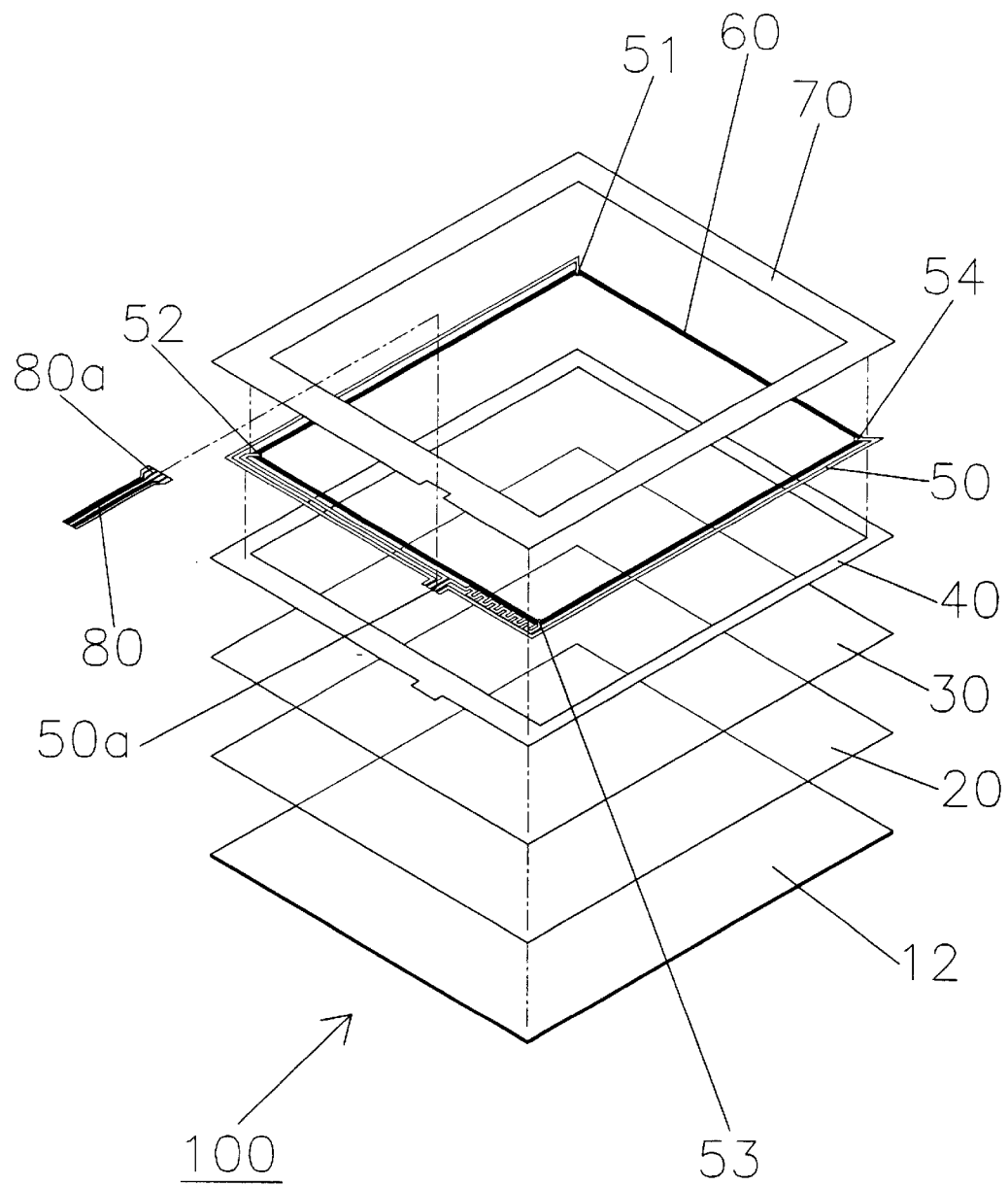
FIG. 1 is an exploded perspective view of an embodiment of the flexible touch control panel according to the present invention.

With reference to FIGS. 1, 2, 3 and 4, the touch control panel according to a preferred embodiment of the present invention is structurally characterized by comprising a current-type touch control shield 10 consisting of a plurality of material layers and being printed on a flexible, transparent plastic membrane 12. The flexible, current-type touch control panel 100 thus formed is flexibly bendable to an angle of at least from 0°–180°.

According to the main features described above, the touch control panel 100, by its bendability, can be attached onto the surface of any curved display panel 85.

According to the main features described above, one or more touch control shields 10(10') may at least be printed on the transparent plastic membrane 12, and can be adhered onto the surface of a folded-type display panel 85(85').

According to the main features described above, the material layers of the touch control shield 10 comprise:

a transparent or translucent ITO (Indium Tin Oxide) conductive film 20 printed by printing on the surface of the transparent plastic membrane 12;

a transparent or translucent conductive thin, protective layer 30 printed by printing on the ITO conductive film 20;

a lower isolation layer 40 in the form of a rectangular frame, printed on the four peripheral edges of the protective layer 30;

a plurality of silver printing layers 50 printed by printing on the surface of the lower isolation layer 40;

a linearization pattern 60 of a generally rectangular frame printed by printing on the protective layer 30 and located on the inner side of the frame of the silver printing layer 50, the linearization pattern 60 having four corners connected to the inner connecting ends 51, 52, 53 and 54 of the silver printing layer 50, respectively; and an upper isolation layer 70 generally in the form of a rectangular frame, and printed by printing on the silver printing layer 50 and linearization pattern 60.

According to the main features described above, a soft tail 80 has a connecting end 80*a* connected to the external connecting end 50*a* of the silver printing layer 50, and can output the current value signal touched on the touch control panel 100.

Figure 6:
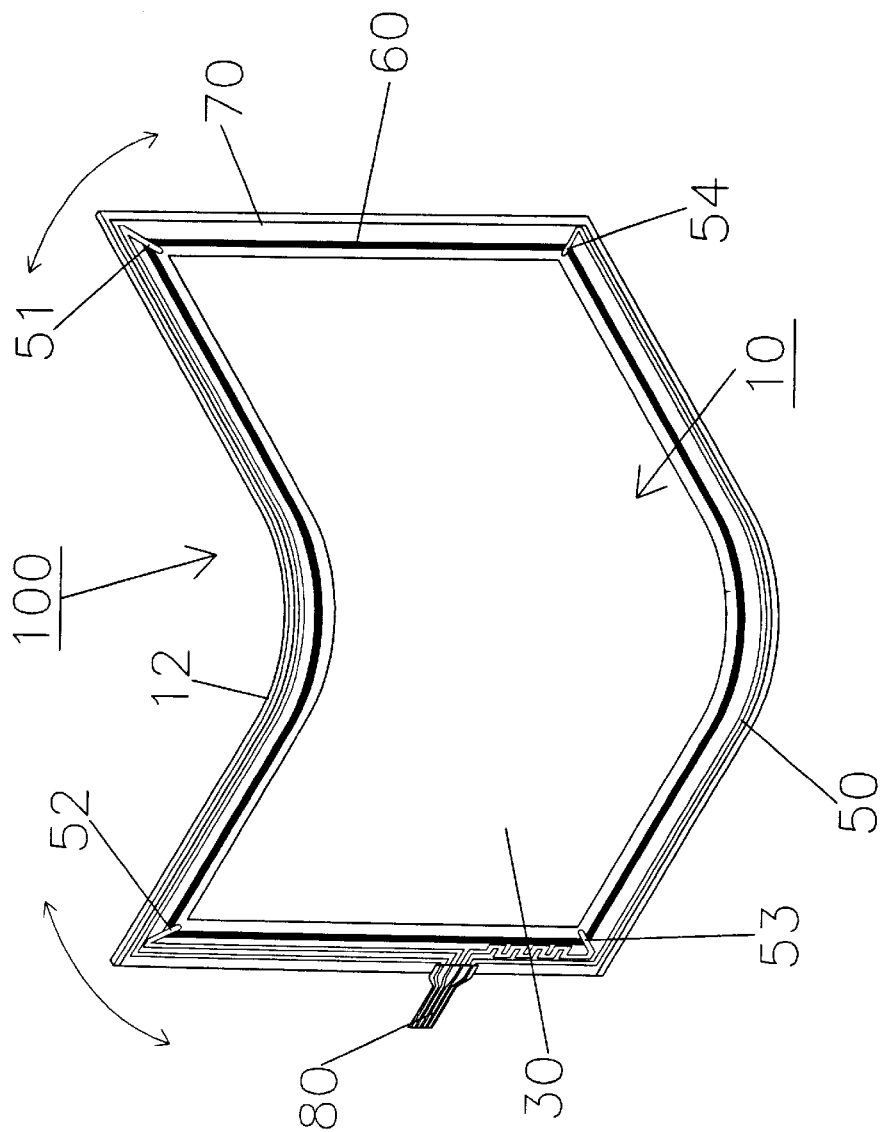
FIG. 6 is a perspective view showing the present invention bent into an arcuate form.
Figure 7:
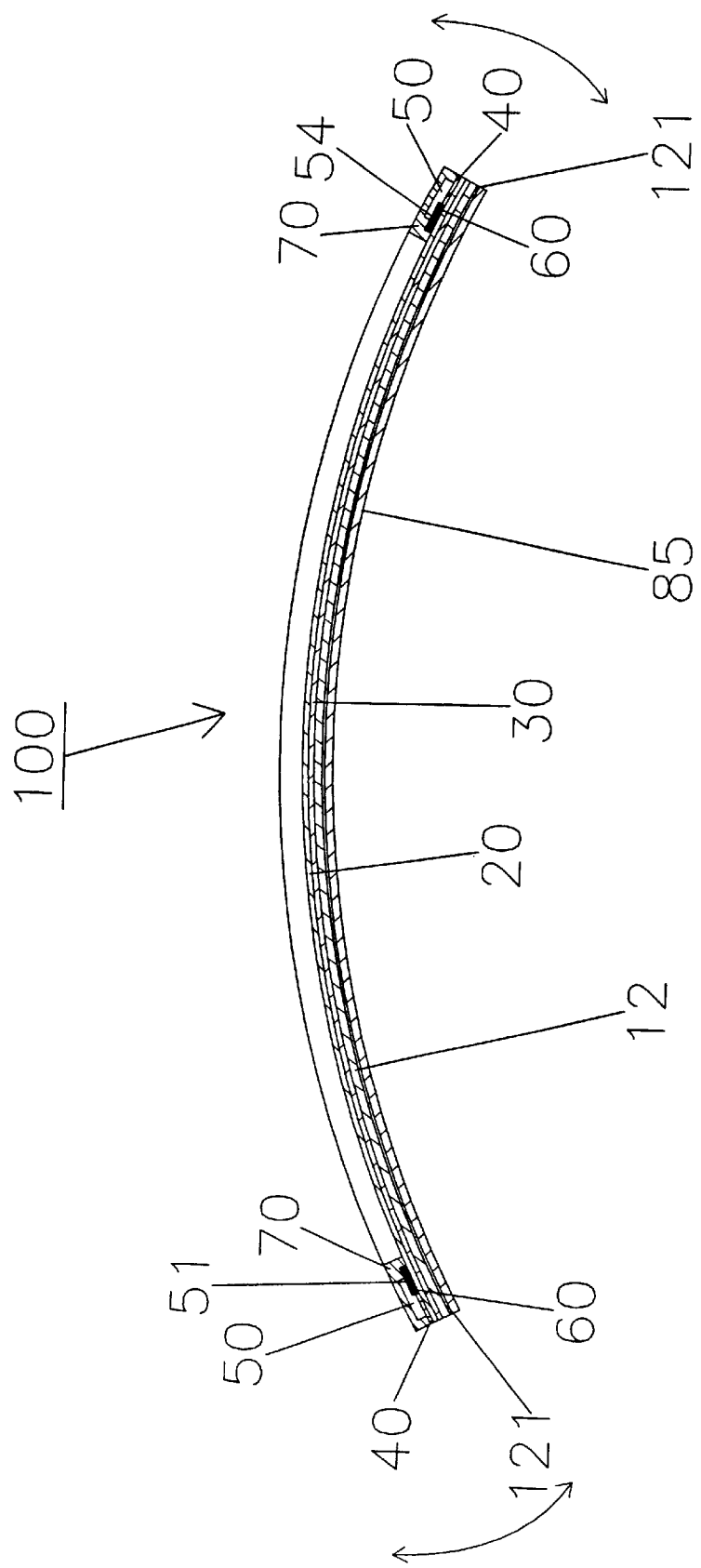
FIG. 7 is a sectional view showing the present invention attached onto an arcuate display panel.

As achieved by the main and sub-features described above, the present invention has the following embodiments and superior effects in practice:

(1) The main feature of the present invention resides in that material layers such as the touch control shield 10 are printed by printing on a flexible transparent plastic membrane 12. The membrane 12 preferably consists of PE plastic material, and the thickness of the membrane 12 is preferably in the range of 0.3 mm–1.5 mm. Such thickness achieves better flexibility (elastic) effect. As shown in FIG. 6, the two ends of the entire touch control panel 100 may be bent to any angle of curve by force. The angle included by the two bent ends may be in the range of 0°–180°. Due to the progress in information technology, some electronic devices such as the personal digital processor (PDA) or electronic books or cell phones . . . etc. have display panels which are no longer restricted to being flat or planar. The display panel may be designed to be of arcuate or folded form. Referring to FIG. 7, the bottom face of the transparent plastic membrane 12 of the touch control panel 100 according to the present invention may be adhered evenly to the arcuate surface of the display panel 85 (LCD, LED) by means of a transparent adhesive 121. Furthermore, after the display panel (LCD, LED) having arcuate surface is bonded with the touch control panel 100 of the present invention, a user is able to make point-contact to the touch control panel 100 using a finger or other conductive tool to obtain various functions such as writing, drawing, touch-selection, . . . etc.

Figure 2:
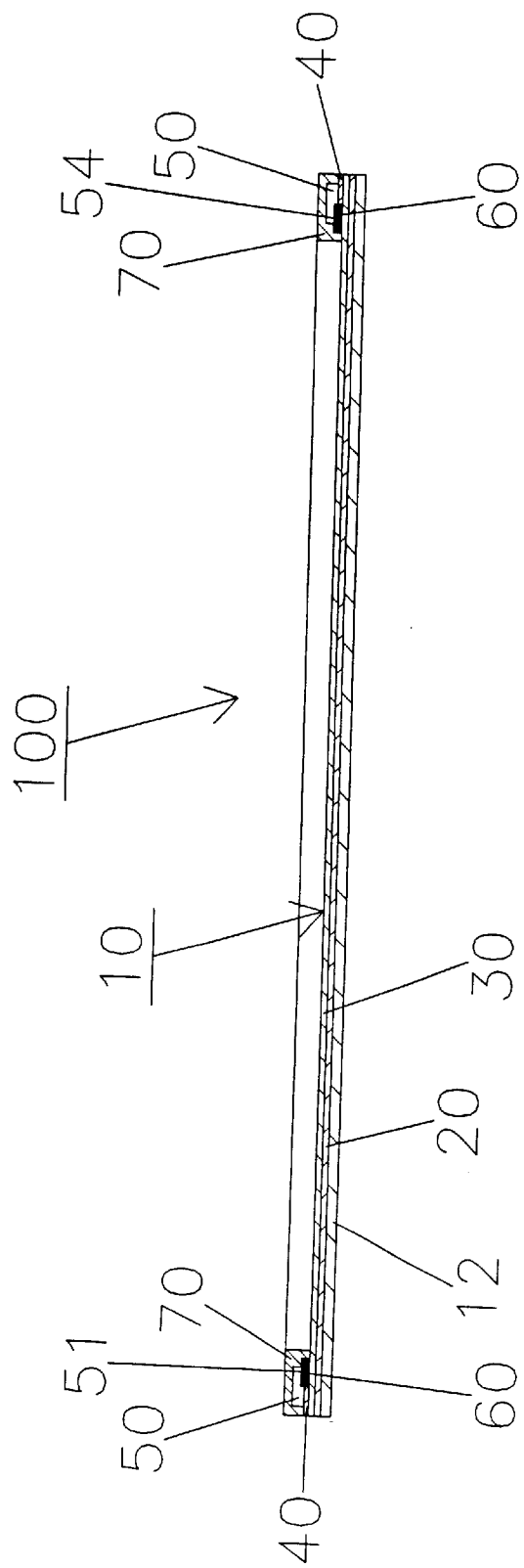
FIG. 2 is a sectional view of the present invention.
Figure 3:
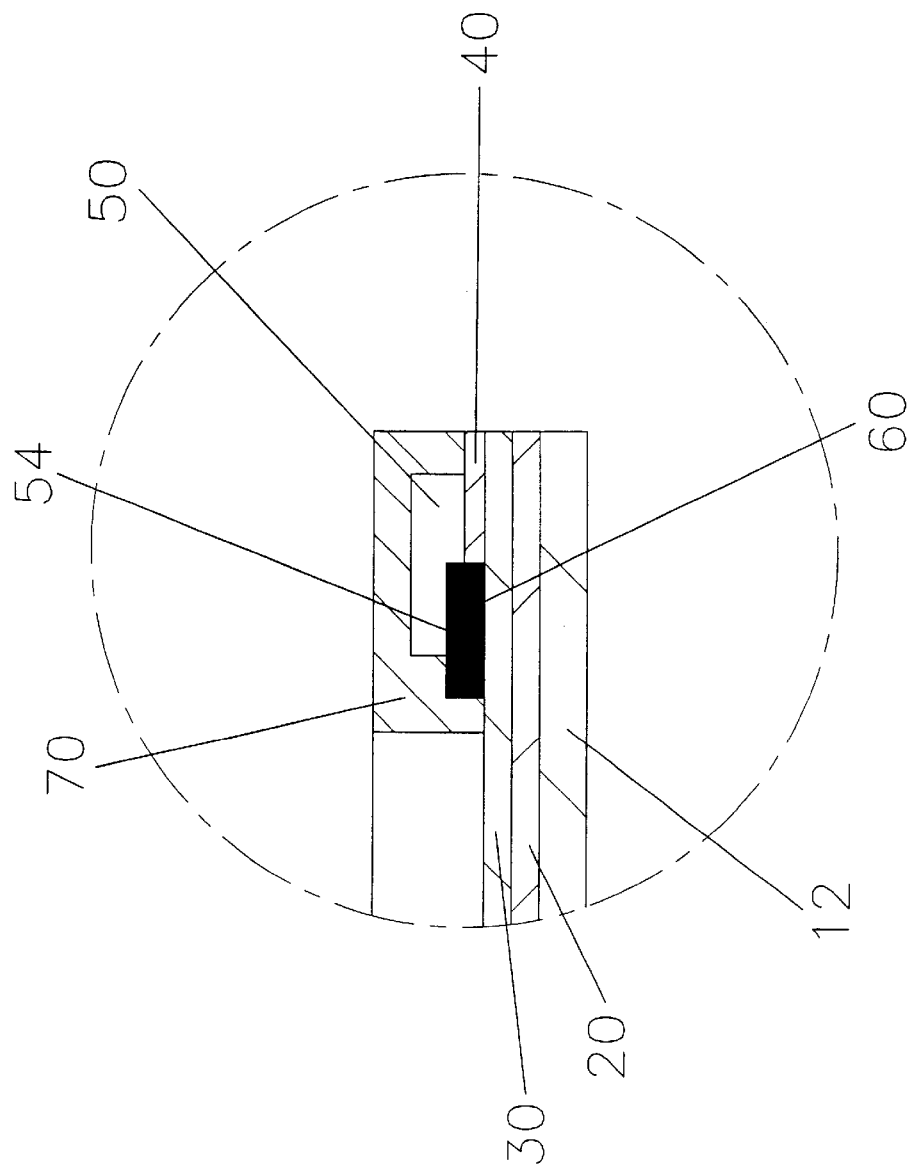
FIG. 3 is an enlarged partial sectional view of the present invention.

(2) With reference to FIGS. 1 and 2, the material of the conductive film 20 may be indium tin oxide (ITO), which is printed by printing, considerably thinly, on the surface of the transparent plastic membrane 12 and renders the conductive film 20 to be transparent or translucent. Since the conductive film 20 is distributed over the transparent plastic membrane 12 in the form of a very thin layer, it can be easily scraped and damaged. Therefore, the upper surface of the conductive film 20 must be further printed with a thin protective layer 30 having greater hardness to prevent the conductive film 20 from being scraped and damaged. The protective layer 30 consists of a thin layer of transparent film having conductivity.

The lower isolation layer 40 is printed on the four peripheral sides of the protective layer 30 in the form of a frame.

The linearization pattern 60 is a printable oily ink layer formed by the mixture of highly conductive silver powder and carbon powder with a contact agent solution. Therefore; the linearization pattern 60 is essentially an oily ink layer (C-Slier) and this material is used to print framing lines on the periphery of protective layer 30. In other words, uniform resistor framing lines are printed on the outer periphery of the protective layer 30. The silver printing 50 has a plurality of silver pasty line strips which are directly printed by printing on the surface of the four peripheral edges of the lower isolation layer 40, wherein the silver printing 50 is preferably distributed by four silver lines, the inner connecting ends 51,52,53,54 of the four silver lines being connected to the connecting ends 80a of the tail 80, respectively, while the outer connecting ends of the tail 80 is connected to the controller (not shown).

The upper isolation layer 70 is printed by printing on the linearization pattern 60 and silver printing 50 and isolates the linearization pattern 60 from the silver printing 50. A current-type touch control shield 10 is formed, which is printed on the flexible transparent plastic membrane 12.

Figure 4:
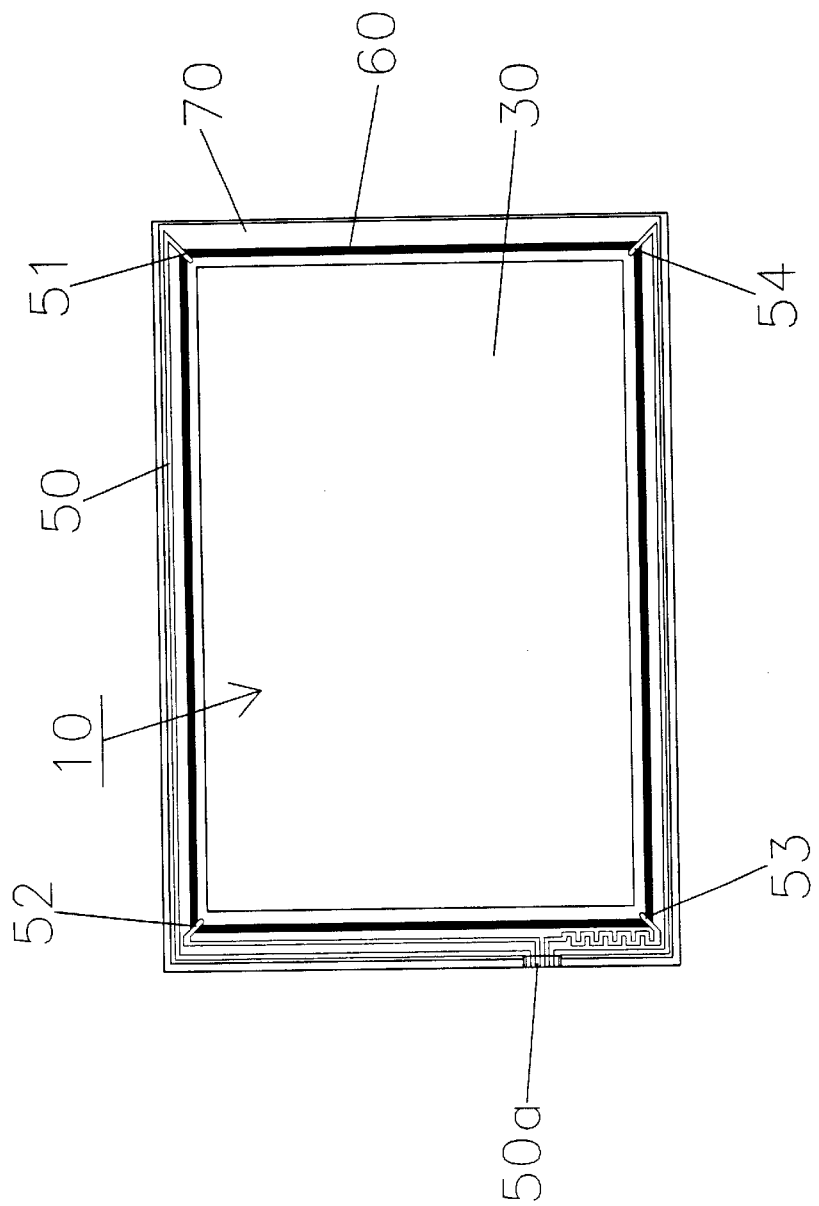
FIG. 4 is a plan view of the present invention.
Figure 5:
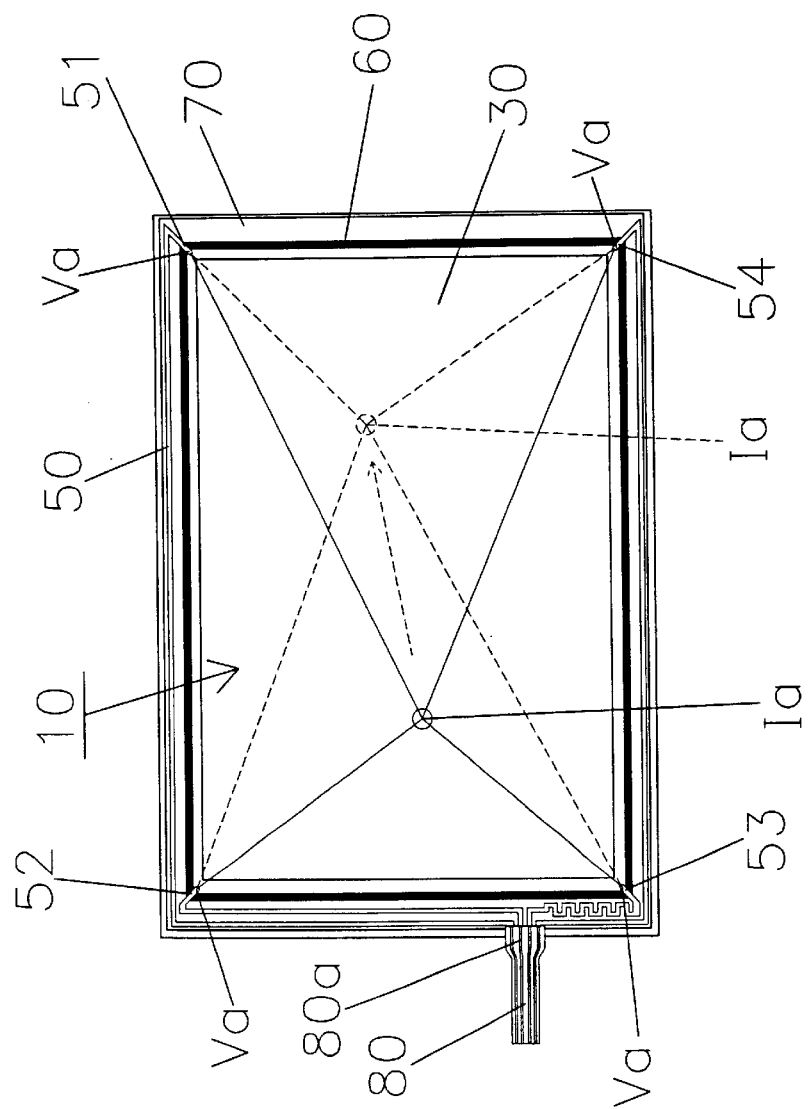
FIG. 5 is a schematic drawing showing the practical operation of touch control according to the present invention.

The controller (not shown) will output four equal voltages to the four corners of the linearization pattern 60 of such touch control shield, and will measure any time the variation of current on the surface of the touch control shield 10. With reference to FIG. 4, when a user touches the surface of the touch control panel 100 with his finger or using a conductive tool, a capacitance effect will be generated. That is, from the equal voltages Va outputted from the controller to the four ends of the linearization pattern 60, these four equal voltages can measure the current reference value Ia of the current variation of the capacitance effect to confirm the position of the contacted point. If the contacted point position is different, the reference value Ia of the current variation current will be different. The current variation reference value measured by the controller will be read and processed by the controller (CPU) in the main computer, and the variation signal of the read and processed current reference value Ia is manifested by the plastic transparent membrane 12 through the display panel 85. Thus, the user can directly write, draw or touch-select various functions (such as the switching of the functional windows) on the touch control shield of the transparent membrane 12.

Figure 8:
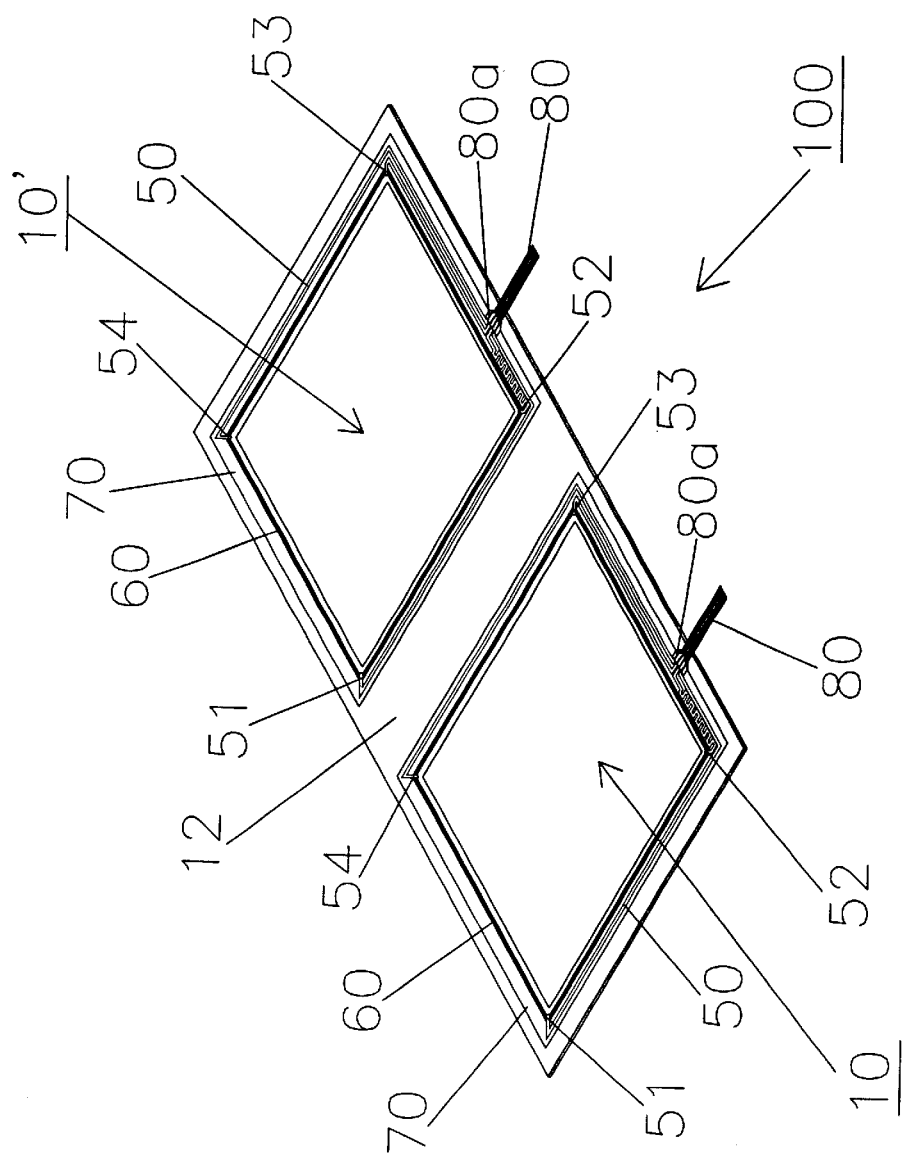
FIG. 8 is a perspective view of an alternative embodiment of the present invention.
Figure 9:
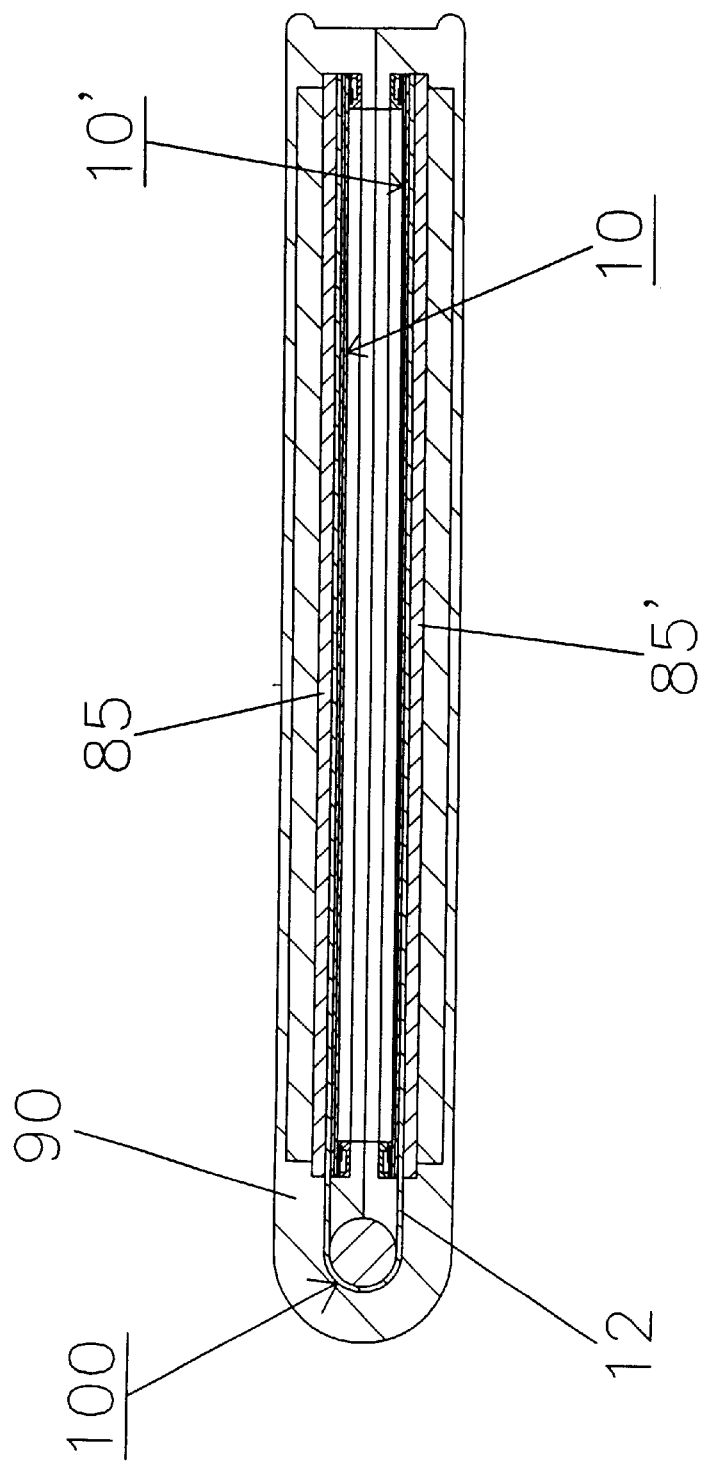
FIG. 9 is sectional view showing the present invention implemented in a folded form.

(3) With reference to FIGS. 8 and 9, an alternative embodiment in which the touch control panel 100 of the present invention is mounted in a folded-type electronic device 90 is shown. A piece of plastic transparent membrane 12 is printed simultaneously with two independent touch control shields 10,10'. The electronic device 90 has two independent display panels 85,85' therein, and the back face of a piece of transparent membrane 12 is evenly attached to the display panels 85,85' by means of the transparent adhesive 121, and allows the two independent touch control shields 10,10' to be bonded onto the display panels 85,85', respectively, Thereby, when the electronic device 90 is folded, the touch control panel 100 may flexibly bend substantially to an angle of 180° without any generation of a fold mark or crease. Furthermore, when the device 90 is unfolded to open, the touch control panel 100 rapidly returns to its original (flat) shape.

With its elastic bending and restoration from deformation characteristics, the flexible, current-type touch control panel 100 of the present invention indeed can be implemented on display panels 85,85' having a curved face, as well on folded-type electronic device 90. The features indeed can achieve the intended objects and effects.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A flexible, current-type touch control panel, comprising a current-type touch control shield consisting of a plurality of material layers and being printed on a flexible, transparent plastic membrane, thus forming the flexible, current-type touch control panel which is flexibly bendable to an angle of at least from 0°–180°;

wherein said material layers of said touch control shield comprise:
a transparent or translucent ITO (Indium Tin Oxide) conductive film printed by printing on the surface of said transparent plastic membrane;
a transparent or translucent, conductive, thin protective layer printed by printing on said ITO conductive film;
a lower isolation layer in the form of a rectangular frame, printed on the four peripheral edges of said protective layer;
a plurality of silver printing layers printed by printing on the surface of said lower isolation layer;
a linearization pattern of a generally rectangular frame printed by printing on said protective layer and located on the inner side of the frame of said silver printing layer, wherein said linearization pattern has four corners connected to the inner connecting ends of said silver printing layer, respectively; and
an upper isolation layer generally in the form of a rectangular frame, and printed by printing on said silver printing layer and linearization pattern.

2. A flexible, current-type touch control panel as claimed in claim 1, wherein said touch control panel, by its bendability, can be attached onto the surface of any curved display panel.

3. A flexible, current-type touch control panel as claimed in claim 1, wherein one or more touch control shields may at least be printed on said transparent plastic membrane and can be adhered onto the surface of a folded-type display panel.

4. A flexible, current-type touch control panel as claimed in claim 1, wherein a soft tail has a connecting end connected to the external connecting end of said silver printing layer, and outputs the current value signal touched on the touch control panel.

5. A flexible, current-type touch control panel as claimed in claim 1, wherein a back face of said transparent membrane may be evenly bonded to a display panel by means of a layer of transparent adhesive.

* * * * *